United States Patent
Li et al.

(10) Patent No.: US 10,776,269 B2
(45) Date of Patent: Sep. 15, 2020

(54) TWO LEVEL COMPUTE MEMOING FOR LARGE SCALE ENTITY RESOLUTION

(71) Applicant: International Business Machines Corporation, Armonk, NY (US)

(72) Inventors: Min Li, San Jose, CA (US); Lucian Popa, San Jose, CA (US); Prithviraj Sen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 16/044,050

(22) Filed: Jul. 24, 2018

(65) Prior Publication Data

US 2020/0034293 A1 Jan. 30, 2020

(51) Int. Cl.
| | |
|---|---|
| *G06F 17/30* | (2006.01) |
| *G06F 12/0811* | (2016.01) |
| *G06F 12/0813* | (2016.01) |
| *G06F 3/06* | (2006.01) |
| *G06N 20/00* | (2019.01) |

(52) U.S. Cl.
CPC .......... *G06F 12/0811* (2013.01); *G06F 3/067* (2013.01); *G06F 3/0608* (2013.01); *G06F 3/0641* (2013.01); *G06F 12/0813* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 6,553,394 | B1* | 4/2003 | Perry | G06F 17/10 |
| | | | | 708/200 |
| 7,480,640 | B1* | 1/2009 | Elad | G06Q 10/10 |
| | | | | 706/14 |
| 8,706,915 | B2 | 4/2014 | Duchesneau | |
| 9,171,097 | B2* | 10/2015 | Ceze | G06F 16/9574 |
| 9,678,957 | B2 | 6/2017 | Cormack et al. | |
| 10,395,772 | B1* | 8/2019 | Lucas | G06K 9/64 |
| 2007/0094170 | A1* | 4/2007 | Graf | G06N 20/00 |
| | | | | 706/15 |
| 2010/0293117 | A1* | 11/2010 | Xu | G06N 20/00 |
| | | | | 706/12 |

(Continued)

FOREIGN PATENT DOCUMENTS

| | | |
|---|---|---|
| CN | 104573130 A | 4/2015 |
| CN | 107330020 A | 11/2017 |

OTHER PUBLICATIONS

Around Tveit et al., Multicategory Incremental Proximal Support Vector Classifiers, KE 2003, LNAI 2773, p. 386-392, 2003 (Year: 2003).*

(Continued)

*Primary Examiner* — Jeff A Burke
(74) *Attorney, Agent, or Firm* — Sherman IP LLP; Kenneth L. Sherman; Steven Laut

(57) ABSTRACT

One embodiment provides for a method that includes performing, by a processor, active learning of large scale entity resolution using a distributed compute memoing cache to eliminate redundant computation. Link feature vector tables are determined for intermediate results of the active learning of large scale entity resolution. The link feature vector tables are managed by a two-level cache hierarchy.

22 Claims, 11 Drawing Sheets

(56) References Cited

U.S. PATENT DOCUMENTS

| | | | |
|---|---|---|---|
| 2013/0074058 | A1* | 3/2013 | Gounares ............... G06F 8/443 717/153 |
| 2015/0269494 | A1 | 9/2015 | Kardes et al. |
| 2016/0171075 | A1* | 6/2016 | Erenrich ............ G06F 16/2462 707/738 |
| 2016/0307113 | A1* | 10/2016 | Calapodescu ......... G06F 16/285 |
| 2016/0378765 | A1 | 12/2016 | Bernstein et al. |
| 2017/0032249 | A1 | 2/2017 | Chougule et al. |
| 2017/0075918 | A1* | 3/2017 | Bates-Haus .......... G06F 16/215 |
| 2017/0098013 | A1 | 4/2017 | Shirwadkar et al. |
| 2017/0374151 | A1 | 12/2017 | Moorthi et al. |
| 2018/0025092 | A1* | 1/2018 | Aharonov ............... G06F 16/81 707/744 |
| 2018/0137150 | A1* | 5/2018 | Osesina ................. G06N 5/048 |
| 2019/0311288 | A1* | 10/2019 | Noma .................... G06N 20/00 |

OTHER PUBLICATIONS

Qunbin Li et al., Adaptive Kernel Caching for SVM Training, (Year: 2019).*

Ashish Kapoor et al., On Discarding, Caching and Recalling Samples in Active Learning, UAI 2007 (Year: 2007).*

Anna Primpeli, Generalized Matching Knowledge using Active Learning, Proceedings of VLDB 2017 PHd Workshop (Year: 2017).*

Arasu, A. et al., "On Active Learning of Record Matching Packages", In Proceedings of the 2010 ACM SIGMOD Int'l on Management of data, Jun. 6-10, 2010, pp. 783-794, ACM, United States Conference.

Sarawagi, S. et al., "Interactive Deduplication Using Active Learning", In Proceeding of the 8th ACM SIGKDD Int'l Conference on Knowledge discovery and data mining, Jul. 23, 2002, pp. 269-278, ACM, United States.

De Freitas, J. et al., "Active Learning Genetic programming for record deduplication", In IEEE Congress on Evolutionary Computation, Jul. 18, 2010, pp. 1-8, IEEE, United States.

Isele, R. et al. "Active Leaming of Expressive Linkage Rules using Genetic Programming", Web Semantics: Science, Services and Agents on the World Wide Web, Dec. 1, 2013, vol. 23, pp. 2-15, Elsevier, United States.

Tejada, S. et al., "Learning Object Identification Rules for Information Integration", Information Systems, Dec. 1, 2001, vol. 26, No. 8, pp. 607-633, Elsevier, United States.

Efron, B. et al., "An introduction to the bootstrap", CRC press, May 5, 1994.

Dal Bianco, G. et al., "A practical and effective sampling selection strategy for large scale deduplication" IEEE Transactions on Knowledge and Data Engineering, vol. 27, No. 9, Mar. 27, 2015, pp. 2305-2319, IEEE, United States.

Bellare, K. et al., "Active Sampling for Entity Matching", In Proceedings of the 18th ACM SIGKDD international conference on Knowledge discovery and data mining, Aug. 12, 2012, pp. 1131-1139, ACM, United States.

Mozafari, B. et al., "Scaling up crowd-sourcing to very large datasets: a case for active learning", In Proceedings of the VLDB Endowment, Oct. 2014, vol. 8, No. 2 pp. 125-136, ACM, United States.

Koudas, N. et al., "Record linkage: similarity measures and algorithms", In Proceedings of the 2006 ACM SIGMOD international conference on Management of data, Jun. 27, 2006, pp. 802-803, ACM, United States.

Angluin, D. et al., "Queries and Concept Learning", Machine Learning, Apr. 1988, vol. 2, No. 4, pp. 319-342, Springer, Berlin, Heidelberg.

Bach, S.H. et al., "Hinge-loss markov random fields and probabilistic soft logic", May 17, 2015, arXiv preprint arXiv:1505.04406.

Beygelzimer, A. et al., "Agnostic active learning without constraints", In Advances in Neural Information Processing Systems, 2010, pp. 199-207, Neural Information Processing Systems Foundation.

Bilenko, M. et al., "Adaptive blocking: Learning to scale up record linkage", In Sixth International Conference on Data Mining (ICDM'06), Dec. 18, 2006, pp. 87-96, IEEE, United States.

Dasgupta, S. et al., "Hierarchical sampling for active learning", In Proceedings of the 25th international conference on Machine learning, Jul. 5, 2008, pp. 208-215, ACM, United States.

Demartini, G. et al., "Large-scale linked data integration using probabilistic reasoning and crowdsourcing", The VLDB Journal—The International Journal on Very Large Data Bases, Oct. 1, 2013, vol. 22, No. 5, pp. 665-687, ACM, United States.

Dong, X. et al., "Reference reconciliation in complex information spaces", In Proceedings of the 2005 ACM SIGMOD international conference on Management of data, Jun. 14, 2005, pp. 85-96, ACM, United States.

You, G. et al., "Socialsearch: enhancing entity search with social network matching", In Proceedings of the 14th International Conference on Extending Database Technology, Mar. 21, 2011, pp. 515-519, ACM, United States.

Fellegi, I.P., et al. "A Theory for Record Linkage", Journal of the American Statistical Association, Dec. 1, 1969, vol. 64, No. 328, pp. 1183-210, United States.

Fisher, J. et al. "Active learning based entity resolution using Markov logic", In Pacific-Asia Conference on Knowledge Discovery and Data Mining, Apr. 19, 2016, pp. 338-349, Springer, Berlin, Heidelberg.

Freund, Y. et al., "Selective sampling using the query by committee algorithm", Machine learning, Aug. 1, 1997, vol. 28, No. 2-3, pp. 133-168, Springer, Berlin, Heidelberg.

Getoor, L. et al., "Entity resolution for big data", In Proceedings of the 19th ACM SIGKDD international conference on Knowledge discovery and data mining, Aug. 11, 2013, pp. 1527-1527, ACM, United States.

Goga, O. et al., "On the reliability of profile matching across large online social networks", In Proceedings of the 21th ACM SIGKDD International Conference on Knowledge Discovery and Data Mining, Aug. 10, 2015, pp. 1799-1808, ACM, United States.

Hernández, M. et al., "HIL: a high-level scripting language for entity integration", In Proceedings of the 16th international conference on extending database technology, Mar. 18, 2013, pp. 549-560, ACM, United States.

Hernández, M.A. et al., "The merge/purge problem for large databases", In ACM Sigmod Record, Jun. 1, 1995, vol. 24, No. 2, pp. 127-138, ACM, United States.

Kääriäinen, M., "Active learning in the non-realizable case", In International Conference on Algorithmic Learning Theory, pp. 63-77. Springer, Berlin, Heidelberg, 2006.

Khan, A.R., et al. "Attribute-based crowd entity resolution" In Proceedings of the 25th ACM International on Conference on Information and Knowledge Management, Oct. 24, 2016, pp. 549-558, ACM, United States.

Kok, S. et al., "Learning Markov logic networks using structural motifs", In Proceedings of the 27th international conference on machine learning (ICML-10), 2010, pp. 551-558.

Köpcke, H. et al., "Training selection for tuning entity matching". In QDB/MUD, pp. 3-12, 2008.

Michelson, M. et al., "Learning blocking schemes for record linkage" In AAAI, Jul. 16, 2006, vol. 6, pp. 440-445.

Motoyama, M. et al., "I seek you: searching and matching individuals in social networks", In Proceedings of the eleventh international workshop on Web information and data management, Nov. 2, 2009, pp. 67-75. ACM, United States.

Richardson, M. et al., "Markov logic networks." Machine learning, Feb. 1, 2006, vol. 62, No. 1-2, pp. 107-136.

Seung, H. et al., "Query by committee" In Proceedings of the fifth annual workshop on Computational learning theory, Jul. 1, 2992, pp. 287-294. ACM, United States.

Singla, P. et al., "Entity resolution with markov logic", In Sixth International Conference on Data Mining (ICDM'06), Dec. 18 2006, pp. 572-582, IEEE, United States.

Vapnik, V. et al., "The Nature of Statistical Learning Theory", 1995, Springer-Verlag.

(56) References Cited

OTHER PUBLICATIONS

Verroios, V. et al., "Entity resolution with crowd errors", In 2015 IEEE 31st International Conference on Data Engineering, Apr. 13, 2015, pp. 219-230. IEEE, United States.

Vesdapunt, N. et al. "Crowdsourcing algorithms for entity resolution", Proceedings of the VLDB Endowment, Aug. 1, 2014, vol. 7, No. 12, pp. 1071-1082, ACM, United States.

Wang, J. et al., "Crowder: Crowdsourcing entity resolution", Proceedings of the VLDB Endowment, Jul. 1, 2012, vol. 5, No. 11, pp. 1483-1494, ACM, United States.

Whang, S.E. et al., "Question selection for crowd entity resolution", Proceedings of the VLDB Endowment, Apr. 1, 2013 vol. 6, No. 6, pp. 349-360, ACM, United States.

Christen, P. et al. "Efficient Entity Resolution with Adaptive and Interactive Training Data Selection", 2015 IEEE International Conference on Data Mining, Nov. 14, 2015, pp. 727-732, IEEE, United States.

Balaji, J. et al., "Avatar : Large Scale Entity Resolution of Heterogeneous User Profiles", In Proceedings of the Second Workshop on Data Management for End-To-End Machine Learning, Jun. 15, 2018, pp. 1-10, ACM.

Qian, K. et al., "Active Learning for Large-Scale Entity Resolution", In Proceedings of the 2017 ACM on Conference on Information and Knowledge Management, Nov. 6, 2017, pp. 1379-1388, ACM.

International Search Report and Written Opinion dated Oct. 25, 2019 for International Application PCT/IB2019/056146 from National Intellectual Property Administration, pp. 1-9, Beijing China.

Mell, P., et al., "The NIST Definition of Cloud Computing", National Institute of Standards and Technology Special Publication 800-145, Sep. 2011, pp. 1-7, U.S. Department of Commerce, United States.

Papadakis, G. et al.; "Scaling Entity Resolution to Large, Heterogeneous Data with Enhanced Meta-blocking"; Proceedings 19th International Conference on Extending Database Technology (EDBT), Mar. 15, 2016, pp. 221-232, Open Proceedings, United States.

Li, S.; "A Two-Stage Similarity-aware Indexing for Real-time Large Scale Entity Resolution"; Special Topic in Computer Science, School of Computer Science, Jun. 3, 2013, pp. 1-30, The Australian National University, Austrailia.

Anonymously; "Self-Synchronizing Distributed Cache for Reducing Redundant Data Transfer in Distributed Shared-Nothing Environments"; http://ip.com/IPCOM/000207282D, May 24, 2011, pp. 1-6, ip.com, United States.

Anonymously; "System and method to improve the performance of the candidate list generation process of an Entity Analytics system using in-memory read-only cache"; http://ip.com/IPCOM/000212210D, Nov. 4, 2011, pp. 1-20, ip.com, United States.

Anonymously; "Method and System for Secured Caching of Data Across a Multi-level Memory Hierarchy"; http://ip.com/IPCOM/000196942D, Jun. 21, 2010, pp. 1-3, ip.com, United States.

S., et al., "Scalable entity matching computation with materialization," Proceedings of the 20th ACM international conference on Information and knowledge management, Oct. 24, 2011, pp. 2353-2356, ACM {Abstract Only}.

Whang, S.E. et al., "Entity resolution with evolving rules," Proceedings of the VLDB Endowment, 2010, pp. 1326-1337 vol. 3, No. 1, ACM, United States.

Sellis, T.K., "Multiple-query optimization," ACM Transactions on Database Systems, 1988, pp. 1-40, 13(1):23-52, ACM, United States.

Kathuria, T. et al., "Efficient and Provable Multi-Query Optimization," Proceedings of the 36th ACM PODS, pp. 1-15, 2017, ACM, United States.

Chaudhuri, S. et al., "Optimizing queries with materialized views," Proceedings of the Eleventh International Conference on Data Engineering, 1995, pp. 190-200, IEEE, United States.

Goldstein, J. et al., "Optimizing queries using materialized views: A practical, scalable solution," In: SIGMOD Conference, May 21, 2001, pp. 331-342, vol. 30, No. 2, ACM, United States.

List of IBM Patents or Patent Applications Treated as Related; Quian, K. et al., U.S. Appl. No. 15/947,166, filed Apr. 6, 2018.

* cited by examiner

500
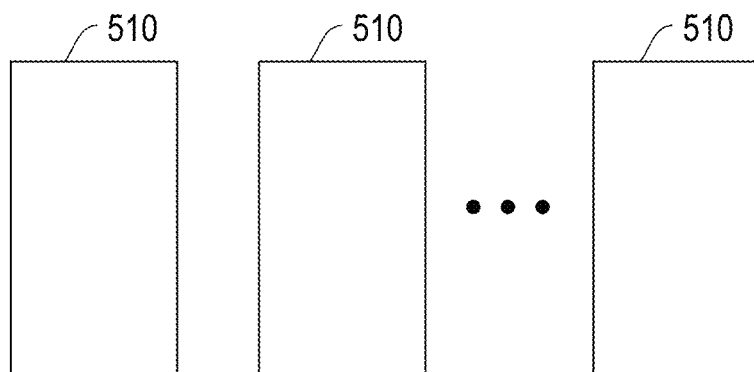
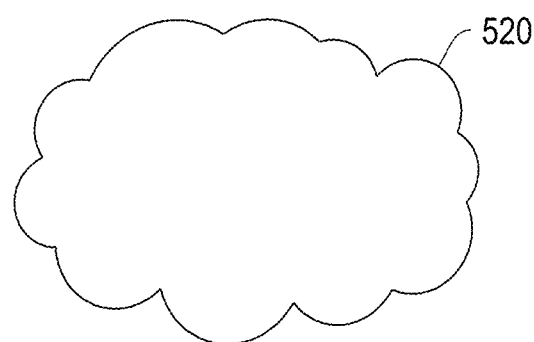
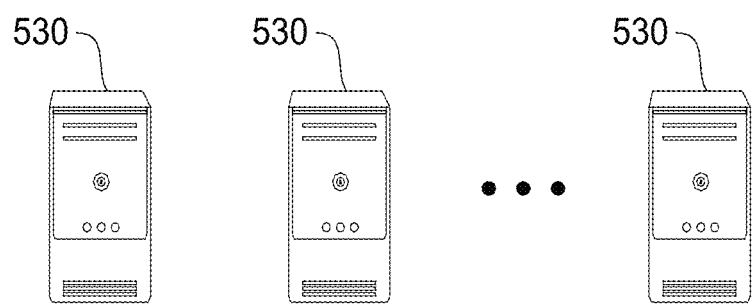
FIG. 5

1000

```
getLink(Rule){
    if links=getMemCache(rule)==null
        if links=getDiskCache(rule)==null
            links=compute(rule);

(er,elinks)=putMemCache(rule,links);
        if(er,elink!=null) putDiskCache(er,elinks);
        return links;
}
(rule,links) putMemCache(Rule, links){
    if(exist) updateorder(inmemcache)
    if inmem cache not full{
        Inmemcache.put(rule, links)
        return null;
    }else {
        (er,elinks)=EvictMem(rule,links);
        if((er,elinks)==(rule, links))
            return (rule,links)
        Inmemcache.put(rule,links)
        Return (er,elinks)
    }
}
putDiskCache(Rule,links){
    if(exist) updateorder(diskcache,memcache)
    if diskcache not full{
        Diskcache.put(rule,links)
    }else {
        (er,elinks)=EvictDisk()
        if((er,elinks)==(rule,links))
            return
        Diskcache.put(rule,links)
    }
}
```

```
Item toEvictMem(item rl){
    if rl covered and regular return rl;
    entry= queue.tail
    if entry.score<score(rl)
    return entry;
}
Item toEvictMem(Item rl){
    if((rl covered and regular)){
        if(cQ Empty){
            return rl;
        }else{
            currE=CQ.tail;
        }
    }else{
        if(cQ Empty)
            currE=RQ.tail
        }else{
            return cQ.tail
        }
    }
}
if(rl.score>currE.score)
    return currE
else
    return rl;
}
```

FIG. 10

TWO LEVEL COMPUTE MEMOING FOR LARGE SCALE ENTITY RESOLUTION

BACKGROUND

Active learning of entity resolution (ER) rules eases users' burden where interactivity is essential. Current solutions do not scale well over large data sets. For data sets with millions of records, each iteration might takes several to tens of minutes on a 6-node cluster.

Matching functions are basic units composing ER rules, which are provided by a user. The active learning learns the composition of several matching functions together with thresholds and generates an ER rule. Multiple iterations of active a learning process outputs a number of ER rules, which as a whole identifies entities that belong to the same real word entity.

Blocking functions are a special type of matching functions that are incorporated into ER rules. One ER rule should have at least one blocking function. Blocking functions are used to reduce the number of pairs to be compared from two-input datasets reducing the computation cost.

SUMMARY

Embodiments relate to optimizing active learning of large scale entity resolution (ER) by using a distributed compute memoing cache to eliminate redundant computations. One embodiment provides for a method that includes performing, by a processor, active learning of large scale entity resolution using a distributed compute memoing cache to eliminate redundant computation. Link feature vector tables are determined for intermediate results of the active learning of large scale entity resolution. The link feature vector tables are managed by a two-level cache hierarchy.

These and other features, aspects and advantages of the present invention will become understood with reference to the following description, appended claims and accompanying figures.

BRIEF DESCRIPTION OF THE DRAWINGS

FIG. 5 is a block diagram illustrating a distributed system for performing a two-level distributed compute memoing cache process, according to one embodiment;

FIG. 10 illustrates an example coding for a two-level distributed compute memoing cache process, according to one embodiment.

DETAILED DESCRIPTION

Figure 1:
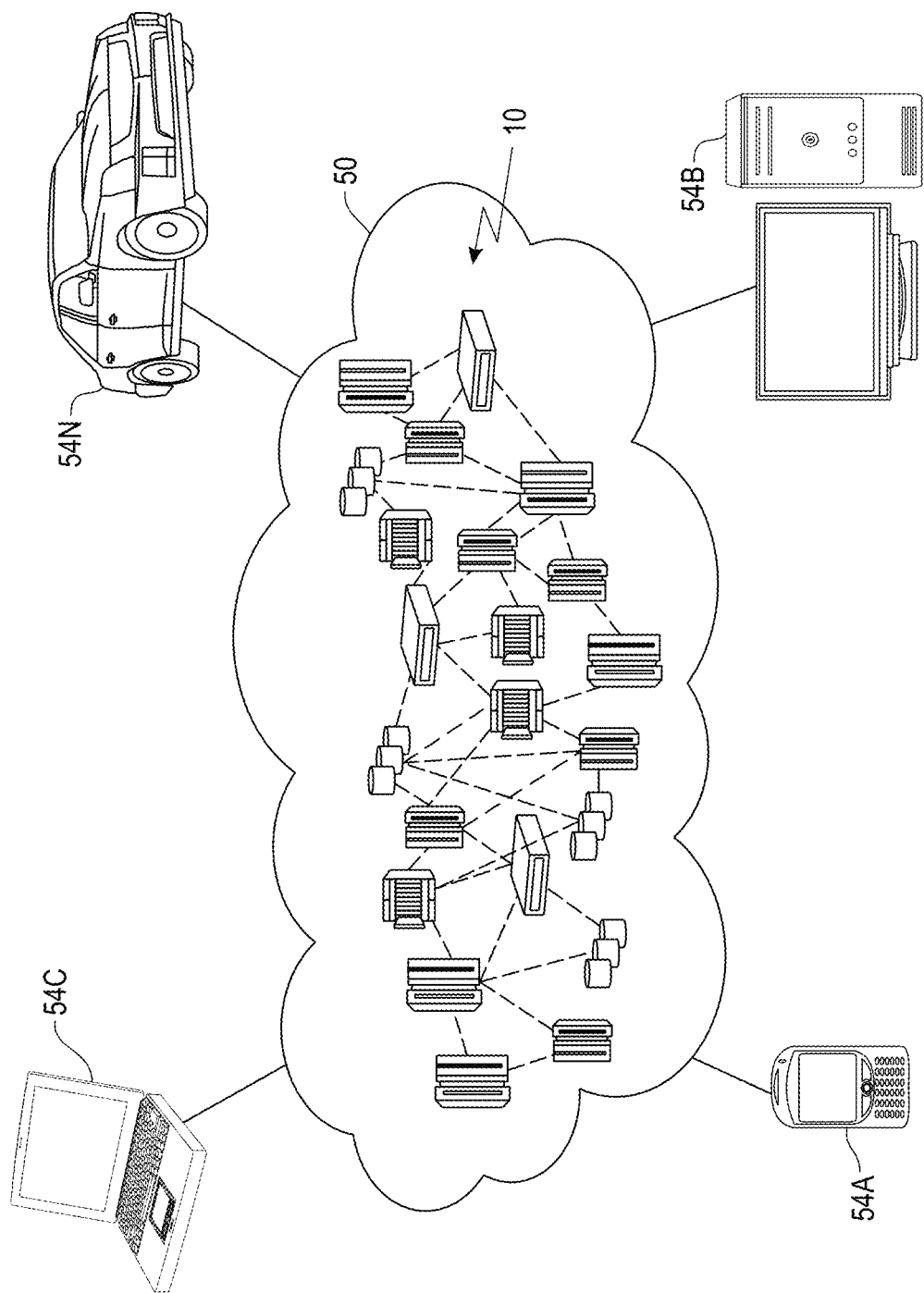
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Embodiments relate to optimizing active learning of large scale entity resolution (ER) by using a distributed compute memoing cache to eliminate redundant computations. One embodiment provides a method that includes performing, by a processor, active learning of large scale entity resolution using a distributed compute memoing cache to eliminate redundant computation. The compute memoing cache stores computed intermediate results by managing link feature vector tables. Link feature vector tables are either pre-computed using the union of all one blocking functions or computed on the fly when matching functions are changed by users.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
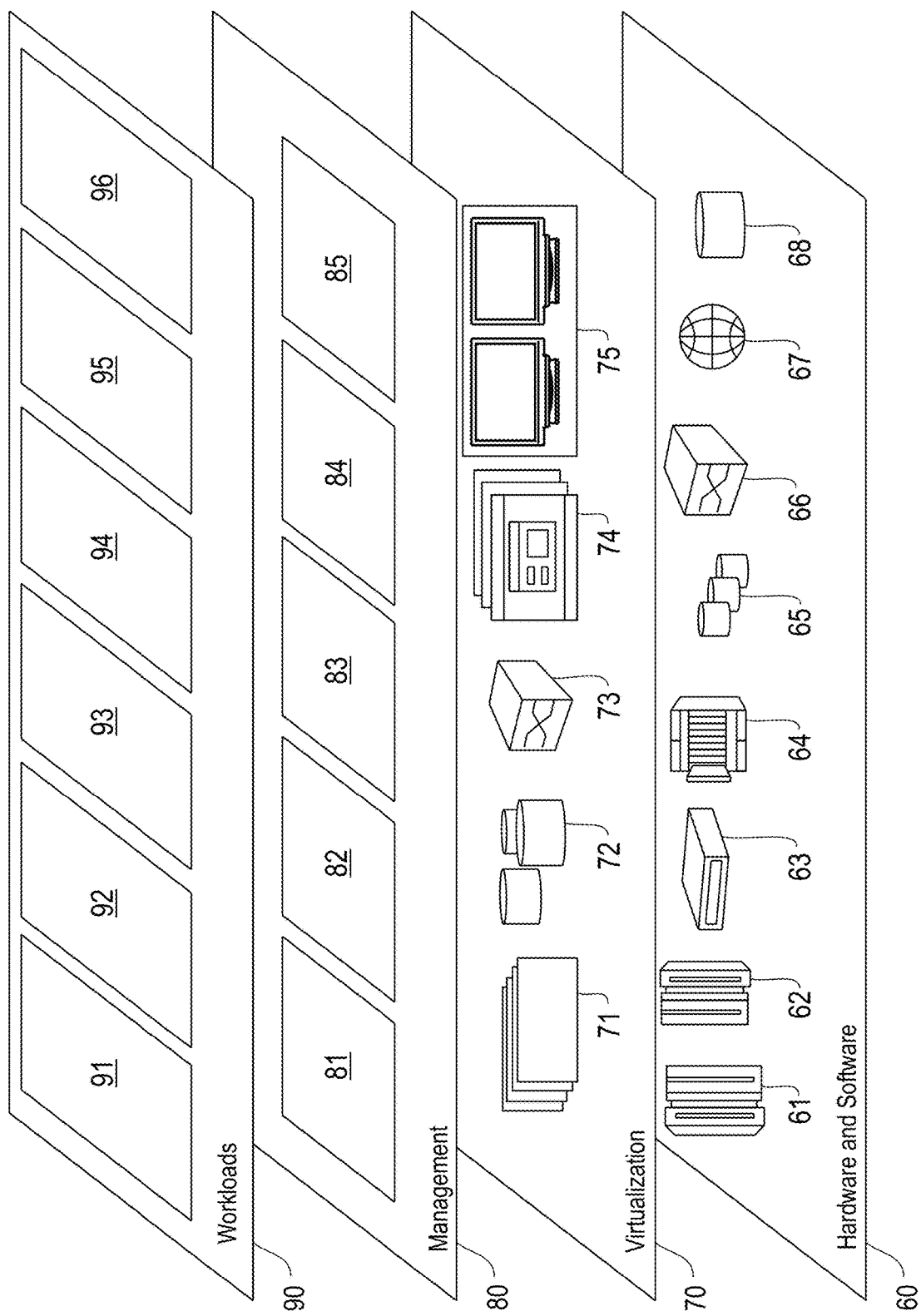
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and optimizing active learning of large scale ER by using a distributed compute memoing cache to eliminate redundant computation processing 96. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3) or the cloud environment 410 (FIG. 4), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
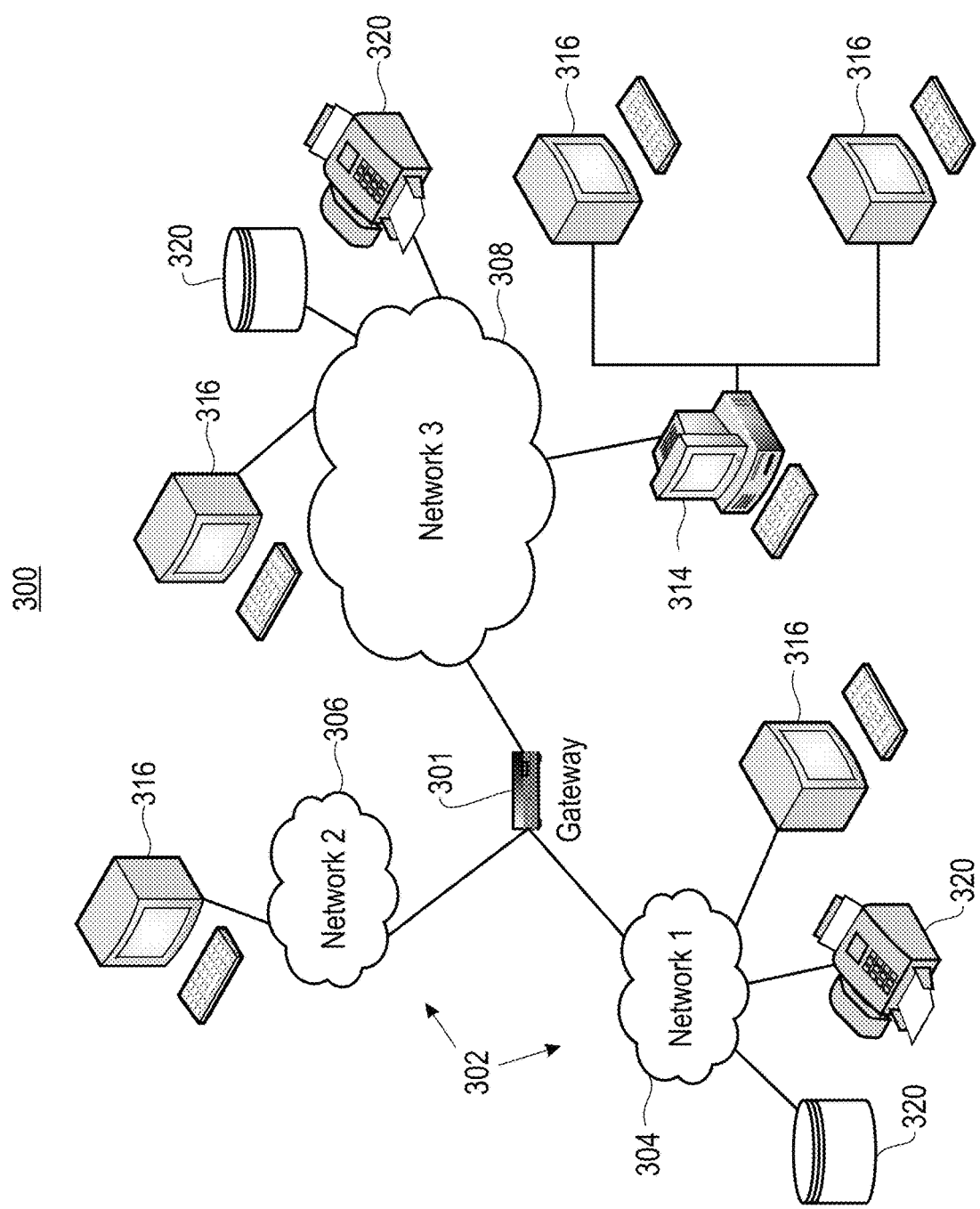
FIG. 3 is a network architecture for a two-level distributed compute memoing cache system, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 316 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICRO-SOFT WINDOWS environment, a MICROSOFT WINDOWS system that emulates an IBM z/OS environment, etc. This virtualization and/or emulation may be implemented through the use of VMWARE software in some embodiments.

Figure 4:
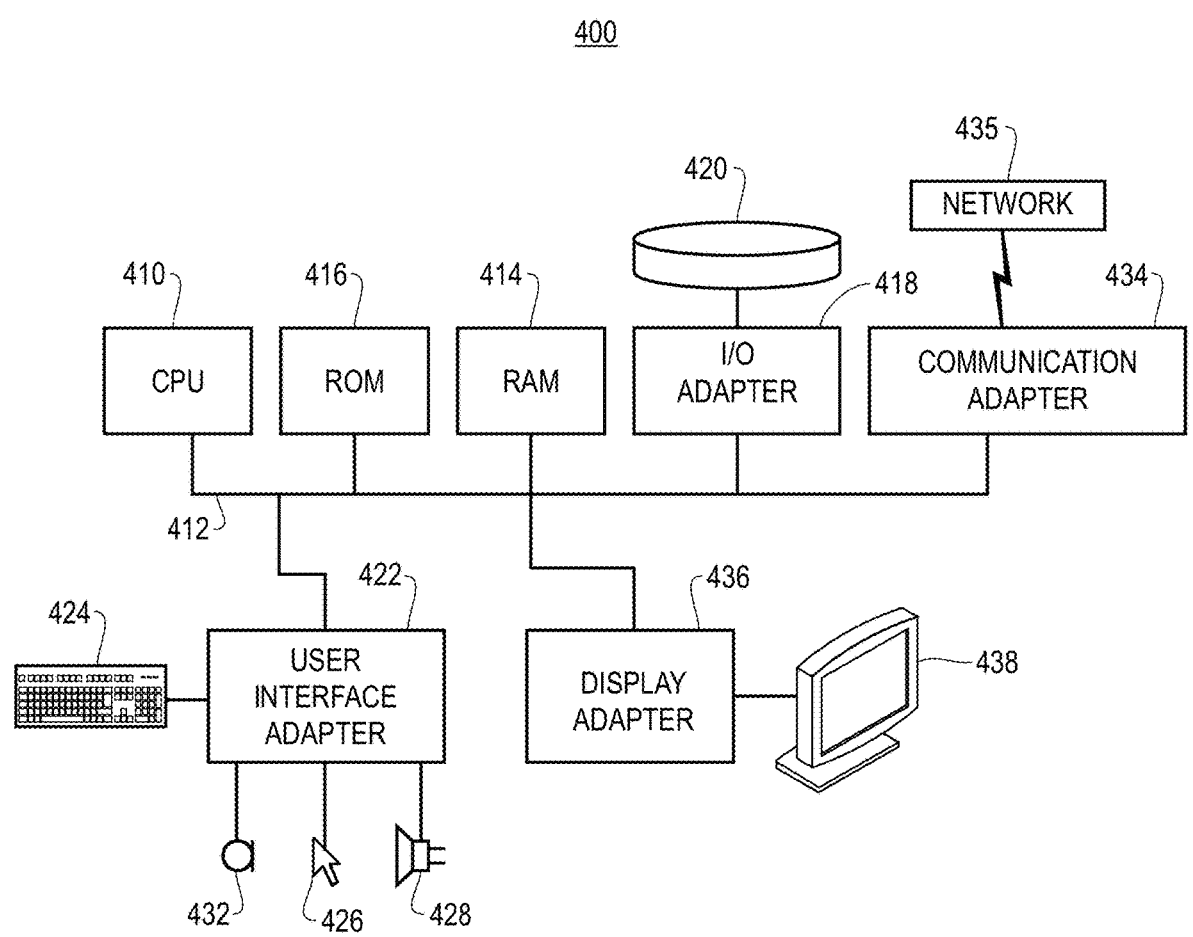
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

FIG. 5 is a block diagram illustrating a system 500 that may be employed for optimizing active learning of large scale ER by using a distributed compute memoing cache to eliminate redundant computation, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a datacenter, etc.), and servers 530. In one embodiment, the client devices are provided with cloud services from the servers 530 through the cloud or resource sharing environment 520.

In one embodiment, system 500, provides for a two level distributed compute memoing cache to eliminate redundant computation of active ER over large data sets including a memory level distributed cache caching compute based on frequencies and storage cost. System 500 provides a disk level distributed cache caching compute based on frequencies, storage cost, compute expense and coverage. An early exit for regular rules is provided by sorting the computed links by similarity score. System 500 provides for an efficient compute caching algorithm/process for learned rules including cardinality clauses.

Figure 6:
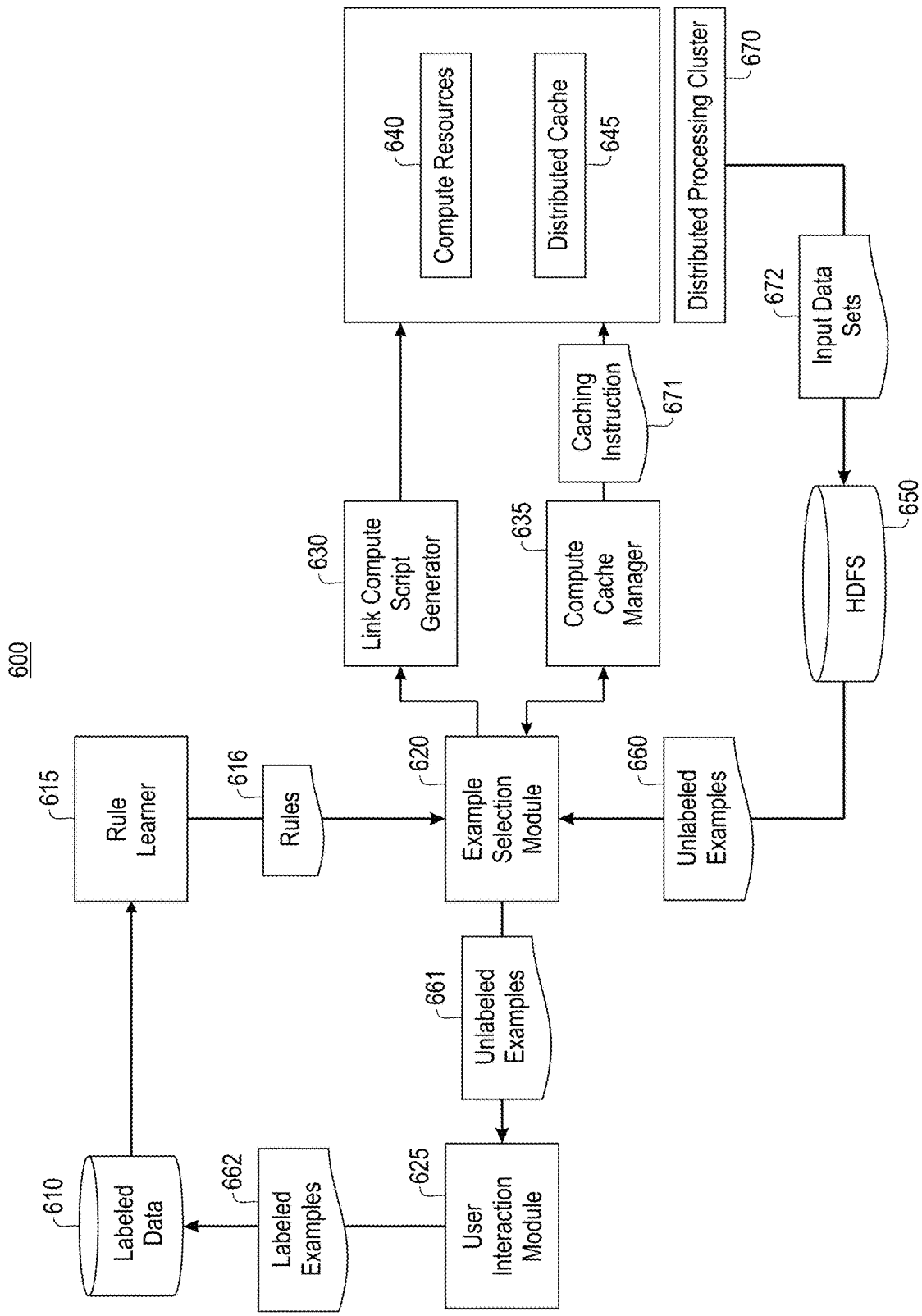
FIG. 6 illustrates an example architecture for a two-level distributed compute memoing cache system, according to one embodiment.

FIG. 6 illustrates an example architecture for a two-level distributed compute memoing cache system 600, according to one embodiment. System 600 includes one or more hardware processor devices for executing instructions from memory. The system includes storage for labeled data 610, a rule learner 615 process, an example selection module/process 620, a user interaction module/process 625, a link compute script generator 630, a compute cache manager 635, a compute resources process 640, a distributed cache 645, a Hadoop distributed file system (HDFS) 650, and a distributed processing cluster 670. In system 600, processing data includes unlabeled examples 660/661, labeled examples 662, rules 616, caching instruction 671 and input data sets 672. The compute cache manager 635 is responsible for caching intermediate results which are a number of link feature vector tables. This cache manager conducts flows of FIGS. 7,8 and 9. The link compute script generator 630 is used to generate the HIL script to leverage the intermediate results.

In one embodiment, given in-memory cache capacity $C_{mem}$ and disk cache $C_{disk}$, system 600 manages the space to maximize the caching efficiency. A schema of cached tables of link feature vectors includes the following format <Id1, Id2, feature vector, similarity score>. In one embodiment, a bitmap is used that represents a feature vector to reduce the storage requirement. The cached table of link feature vectors is sorted by similarity score. Table 1 shows an example table of link feature vectors.

TABLE 1

| id1 | id2 | Feature vector | Sim |
|---|---|---|---|
| 19 | 81 | 10010001 | 0.8 |
| 24 | 50 | 11010011 | 0.5 |
| ... | | | |

In one embodiment, system 600 performs pre-computing when matching functions are unchanged. In this case, the feature vectors stay the same, and the system 600 pre-computes links and feature vectors of all blocking functions and populates the in-memory caches. When an in-memory cache is full, the system 600 caches other tables into the disk memory cache. In one embodiment, the system 600 always finds a nearest containing rule. For example, T.lastName=C.lastName and T.location.state=C.state is a containing rule for T.lastName=C.lastName and T.location.state=C.state and firstNameMatch(T.firstName, C.firstName). The system 600 computes, on the fly, when matching functions are changed, and computes links and feature vectors, which are put to cache.

In one embodiment, a regular rule is a rule that has a largest subset of the predicate. For example, T.lastName=C.lastName and T.location.state=C.state is a containing rule for T.lastName=C.lastName and T.location.state=C.state and firstNameMatch(T.firstName, C.firstName. If multiple candidate rules exist, the system 600 selects the one in memory or the one that has fewest number of links. For cardinality rules, the system 600 removes the cardinality and uses the same policy of the regular rule. Note that the rule removing only the cardinality clause is also considered. For example, T.lastName=C.lastName and T.location.state=C.state is a containing rule for T.lastName=C.lastName and T.location.state=C.state and 1:1. In one embodiment, system 600 provides for an early exit when a learned rule does not include a cardinality clause. System 600 examines the links from the nearest rule from top down, and returns back when the top K links are collected, K being a positive integer.

In one embodiment, system 600 manages the two caches (distributed memory cache and distributed disk cache) based on the access frequency, coverage and computing/processing "expense" (e.g., processing usage, bandwidth, etc.) of tables of link feature vectors, and storage usage. In one embodiment, the "cost" or memory usage model for memory cache is represented as:

$$score = \frac{frequency}{maxFrequency} + norm\left(\frac{1}{Storage}\right).$$

In one embodiment, the system 600 gives higher priority to link sets that are accessed frequently, and that required less storage usage. In one embodiment, the "cost" or memory usage model for disk cache is as follows:

$$score = \frac{compute}{maxcompute} + \frac{frequency}{maxFrequency} + norm\left(\frac{1}{Storage}\right).$$

In addition, system 600 considers high processing usage to compute, and link sets that are not covered by other linked lists.

Figure 7:
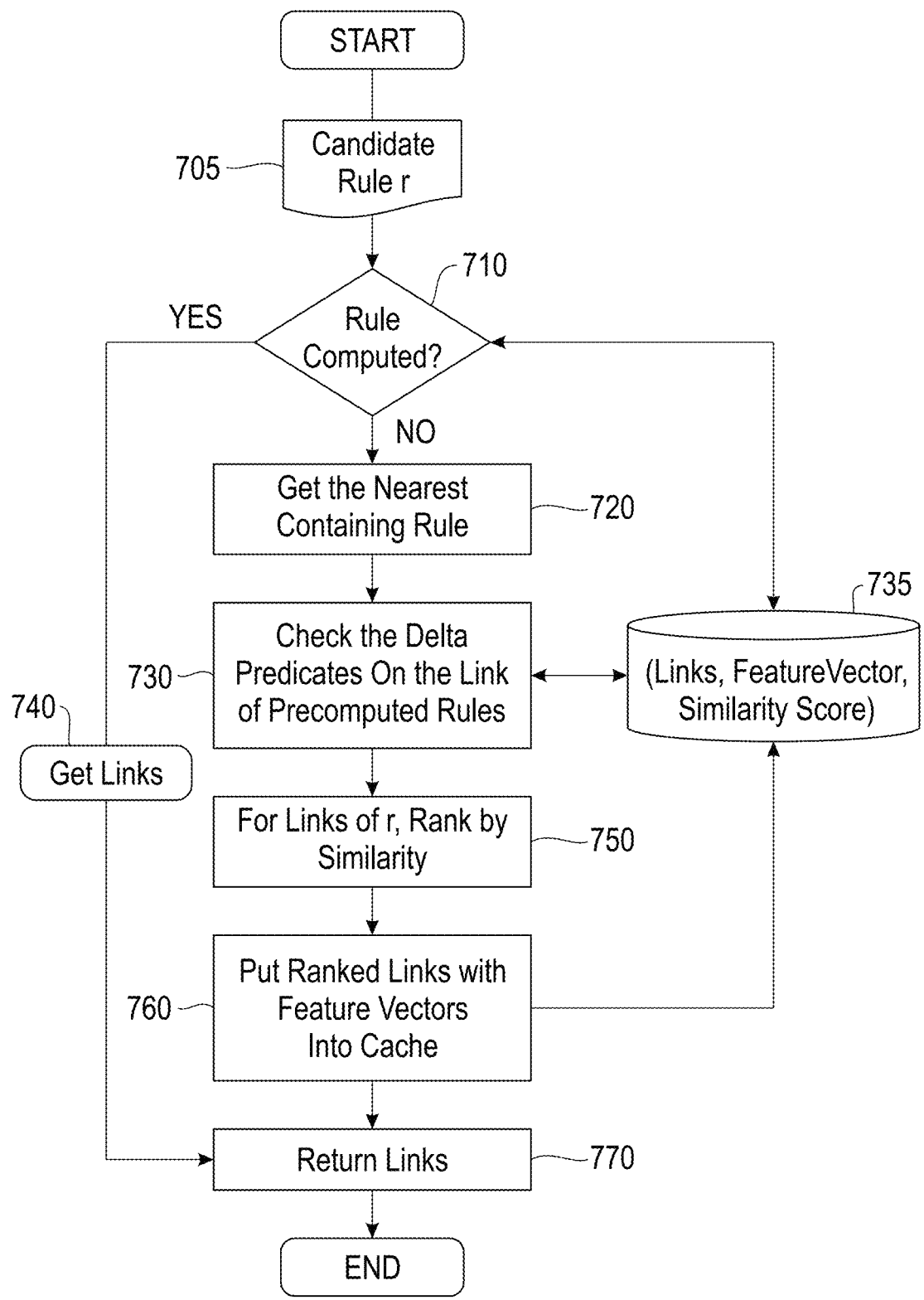
FIG. 7 illustrates a block diagram for a process for caching over precomputed link feature cache, according to one embodiment.

FIG. 7 illustrates a block diagram for a process 700 for caching over precomputed link feature cache, according to one embodiment. In process 700, the inputs include a candidate rule r 705, and links, feature vector and similarity scores from cache 735. In block 710 it is determined whether the candidate rule r 705 is computed or not. If it is determined that the candidate rule r 705 is computed, process 700 proceeds to block 740 and gets the links for the candidate rule r 705 and proceeds to block 770 to return the links. Otherwise, if in block 710 it is determined that the candidate rule r 705 is not computed, in block 720 process 700 gets the nearest containing rule. In block 730, process 700 checks the delta predicates on the link of precomputed rules (using information from cache 735). In block 750 for the links of the candidate rule r 705, process 700 ranks the links by similarity. In block 760, process 700 puts the ranked links with feature vectors into the cache 735. Process 700 then proceeds to block 770 to return the links and then ends.

Figure 8:
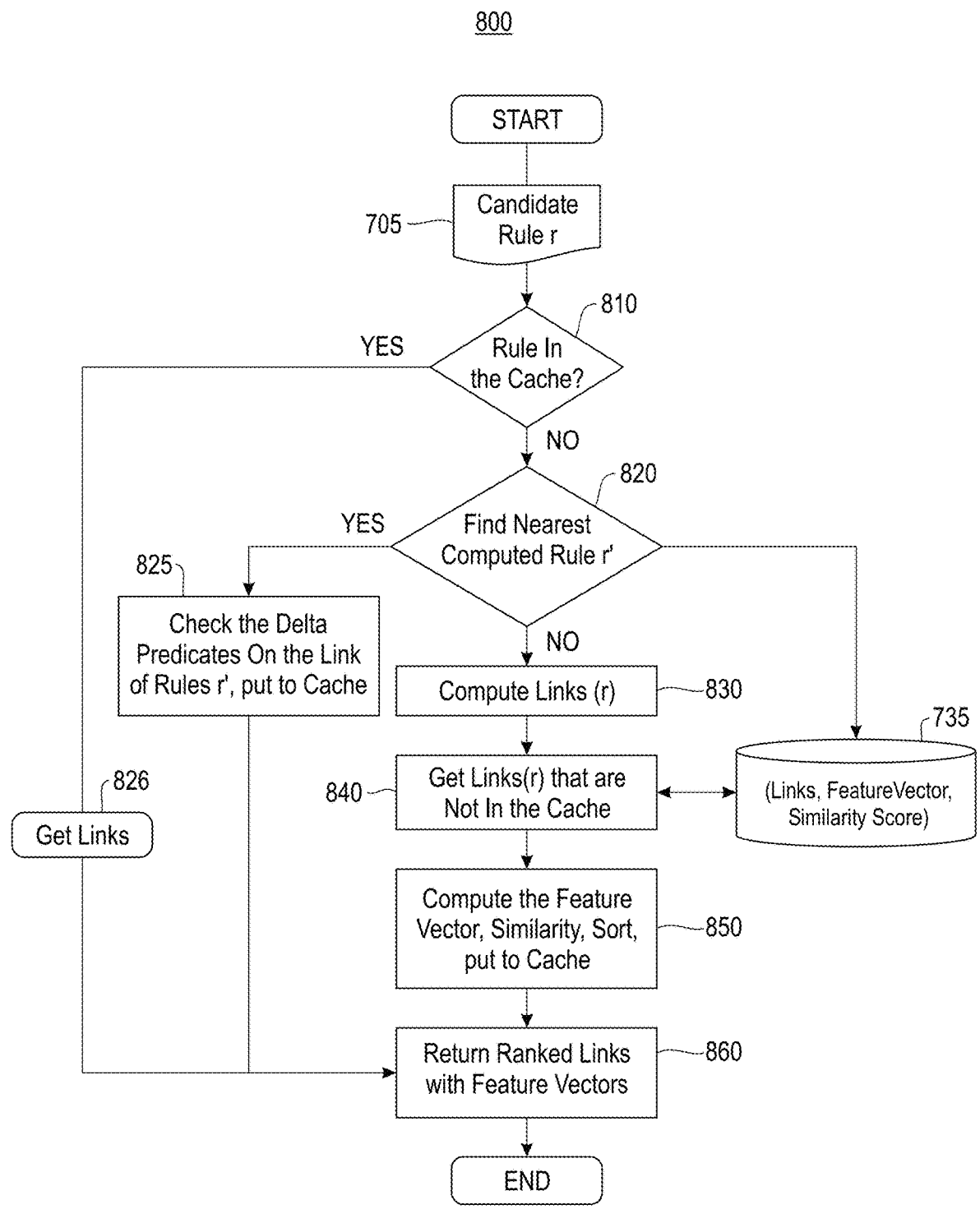
FIG. 8 illustrates a block diagram for a process for computing cache of a link feature vector on the fly, according to one embodiment.

FIG. 8 illustrates a block diagram for a process 800 for computing cache of a link feature vector on the fly, according to one embodiment. In process 800, the inputs include a candidate rule r 705, and links, feature vector and similarity scores from cache 735. In block 810 it is determined whether the candidate rule r 705 is in the cache 735 or not. If it is determined that the candidate rule r 705 is in the cache 735, process 800 proceeds to block 826 and gets the links for the candidate rule r 705 and proceeds to block 860 to returns ranked links with feature vectors and ends. Otherwise, if in block 810 it is determined that the candidate rule r 705 is not in the cache 735, in block 820 process 800 determines whether the nearest computed rule r' can be found or not. If it is determined that the nearest computed rule r' is found, in block 825 process 800 checks the delta predicates on the link of rule r', and puts to cache. Process 800 then proceeds to block 860 and then ends. If it is determined that the nearest computed rule r' is not found, in block 830 process 800 computes the links for candidate rule r 705. In block 840 process 800 gets the links for candidate rule r 705 that are not in the cache 735. In block 850 process 800 computes the feature vector, similarity, sorts and puts the result to cache 735. Process 800 then proceeds to block 860 then ends.

Figure 9:
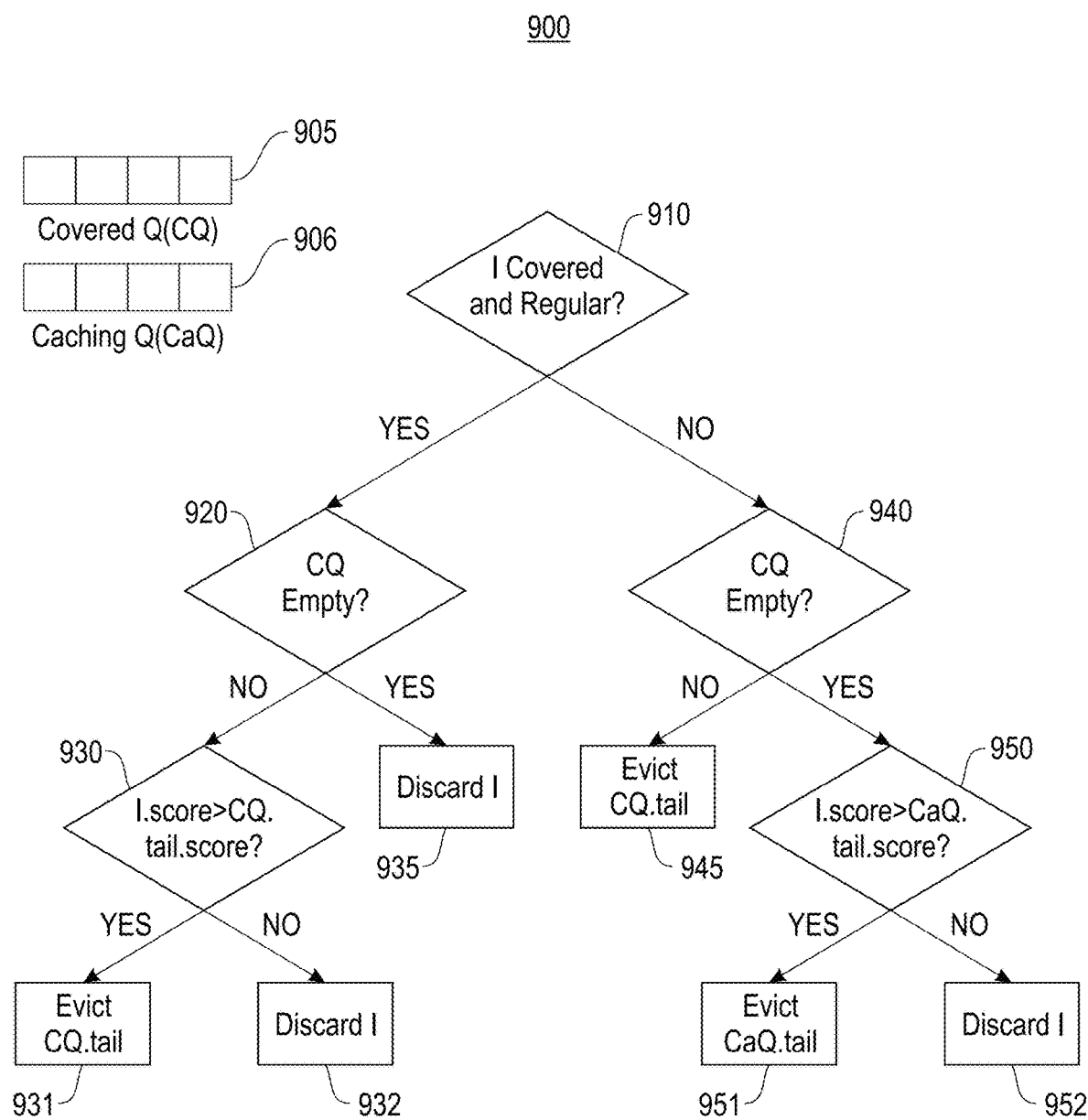
FIG. 9 illustrates an example block diagram for a disk cache management process, according to one embodiment.

FIG. 9 illustrates an example block diagram for a disk cache management process 900, according to one embodiment. In one embodiment, in block 910 process 900 determines whether the result I of a current rule is covered (covered Q(CQ) 905) and regular. Covered means there are some other link feature tables that covers I, such that I can be computed through these link feature tables. Discarding I is less expensive than discarding some intermediate results that are not covered. Regular refers to a regular rule without cardinality clauses. If it is determined that I is covered and regular, process 900 proceeds to block 920 where it is determined whether CQ is empty or not. If it is determined that CQ is empty, process 900 proceeds to block 935 and discards I cache. Otherwise, process 900 proceeds to block 930 where it is determined whether I.score is greater than tail.score. If it is determined that I.score is greater than tail.score, process 900 proceeds to block 931 and evicts the CQ.tail. Otherwise, process 900 proceeds to block 932 and discards I cache.

In one embodiment, if it is determined in block 910 that I is either not covered or not regular, process 900 proceeds to block 940 where it is determined whether CQ is empty or not. If it is determined that CQ is not empty, process 900 proceeds to block 945 and evicts the CQ.tail. Otherwise, process 900 proceeds to block 950 where it is determined whether I.score is greater than CaQ.tail.score. If it is determined that I.score is greater than CaQ.tail.score, process 900 proceeds to block 951 and evicts the CaQ.tail. Otherwise, process 900 proceeds to block 952 and discards I.

FIG. 10 illustrates an example coding 1000 for a two-level distributed compute memoing cache process, according to one embodiment. The coding 1000 includes example coding for getLink, putMemCache, putDiskCache, toEvictMem, and toEvictDisk. In particular, getLink retrieves the links of a current rule from memory compute cache; if no results are returned, it retrieves links from disk compute cache. If no results are returned, getLink then computes the links for the current rule and saves the links to memory cache. If the putMemoryCache Function returns back some other links, which are evicted from the memory cache. The function getLink then puts back the links evicted from memory cache and stores it to disk cache.

Figure 11:
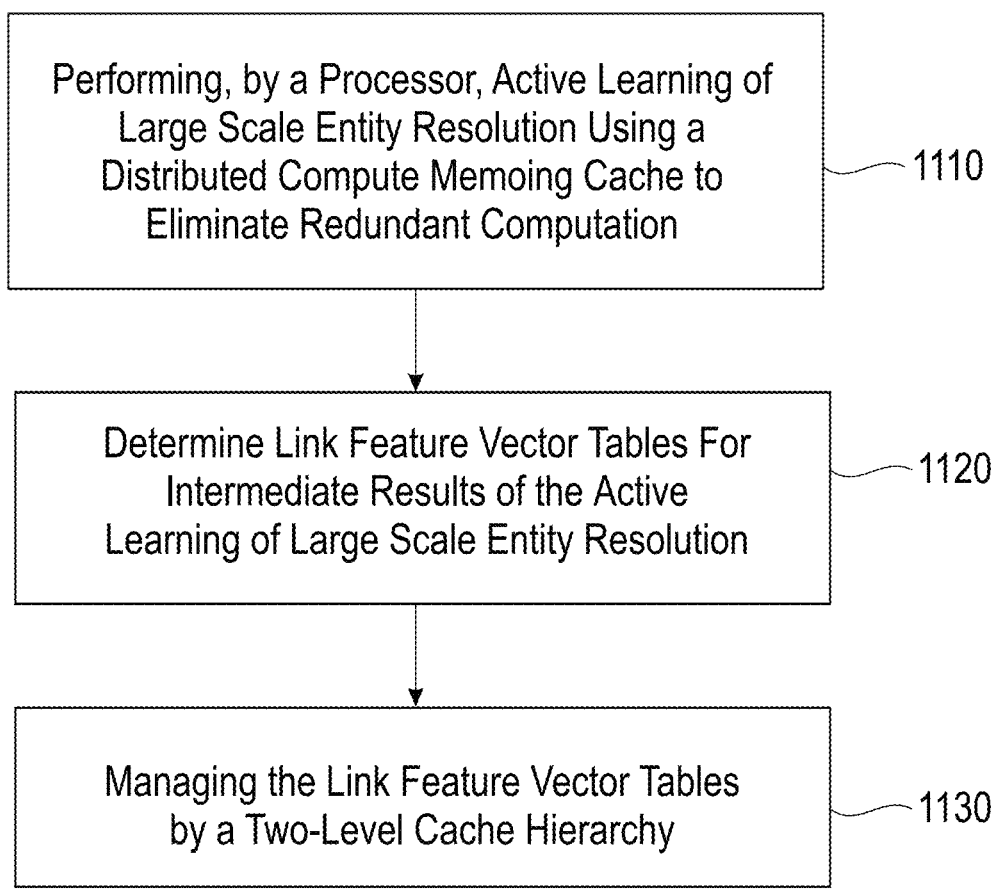
FIG. 11 illustrates a block diagram of a process for optimizing active learning of large scale entity resolution (ER) by using a distributed compute memoing cache to eliminate redundant computations, according to one embodiment.

FIG. 11 illustrates a block diagram for process 1100 for optimizing active learning of large scale entity resolution by using a distributed compute memoing cache to eliminate redundant computations, according to one embodiment. In one embodiment, in block 1110 process 1100 performs, by a processor (e.g., a processor device from any one of FIGS. 1-6), active learning of large scale entity resolution using a distributed compute memoing cache to eliminate redundant computation. In one embodiment, in block 1120 process 1100 determines link feature vector tables for intermediate results of the active learning of the large scale entity resolution In block 1130, process 100 manages the link feature vector tables by a two-level cache hierarchy. In one embodiment, the two-level cache hierarchy includes distributed memory cache and distributed disk cache.

In one embodiment, in process 1100 determining the link feature vector tables includes one of pre-computing the link feature vector tables using a union of all blocking functions or computing the link feature vector tables dynamically upon a change of matching functions (e.g., by a user), and the distributed memory cache manages the link feature vector tables based on frequency and storage usage. The distributed disk cache manages the link feature vector tables based on frequency, storage usage, processing bandwidth and coverage.

In one embodiment, for process 1100, pre-computing the link feature vector tables includes populating memory caches of the distributed memory cache, and upon a determination that the memory caches are full, caching the link vector tables into at least one disk cache of the distributed disk cache.

In one embodiment, process 1100 may further include updating caches of the two-level cache hierarchy upon a determination that the matching functions are changed and the link feature vectors are no longer valid. In process 1100, incremental computation of links is enabled upon a determination that nearest containing rules are cached to avoid redundant computation.

In one embodiment, process 1100 may further include sorting cache of the two-level cache hierarchy by similarity score to obtain the intermediate results. Process 1100 may additionally include examining a top or a bottom portion of the intermediate results to return back most similar or least similar pairs.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
performing, by a processor, active learning of large scale entity resolution using a distributed compute memoing cache to eliminate redundant computation;
sorting cache of a two-level cache hierarchy by similarity score to obtain intermediate results;
determining link feature vector tables for the intermediate results of the active learning of the large scale entity resolution; and
managing the link feature vector tables by a two-level cache hierarchy.

2. The method of claim 1, wherein determining the link feature vector tables comprises one of pre-computing the link feature vector tables using a union of all blocking functions or computing the link feature vector tables dynamically upon a change of matching functions, and the two-level cache hierarchy comprises distributed memory cache and distributed disk cache.

3. The method of claim 2, wherein the distributed memory cache manages the link feature vector tables based on frequency and storage usage.

4. The method of claim 2, wherein the distributed disk cache manages the link feature vector tables based on frequency, storage usage, processing bandwidth and coverage.

5. The method of claim 2, wherein pre-computing the link feature vector tables comprises populating memory caches of the distributed memory cache, and upon a determination that the memory caches are full, caching the link vector tables into at least one disk cache of the distributed disk cache.

6. The method of claim 2, further comprising:
updating caches of the two-level cache hierarchy upon a determination that the matching functions are changed and the link feature vectors are no longer valid.

7. The method of claim 1, wherein incremental computation of links is enabled upon a determination that nearest containing rules are cached to avoid redundant computation.

8. The method of claim 1, further comprising:
examining a top or a bottom portion of the intermediate results to return back most similar or least similar pairs.

9. A computer program product for optimizing active learning of large scale entity resolution in a two-level distributed cache hierarchy, the computer program product comprising a computer readable storage medium having program instructions embodied therewith, the program instructions executable by a processor to cause the processor to:
perform, by the processor, active learning of large scale entity resolution using a distributed compute memoing cache to eliminate redundant computation;
sort, by the processor, cache of the two-level cache hierarchy by similarity score to obtain intermediate results;
determine, by the processor, link feature vector tables for the intermediate results of the active learning of large scale entity resolution; and
manage, by the processor, the link feature vector tables by using the two-level cache hierarchy.

10. The computer program product of claim 9, wherein determination of the link feature vector tables comprises one of pre-computing the link feature vector tables using a union of all blocking functions or computing the link feature vector tables dynamically upon a change of matching functions, and the two-level cache hierarchy comprises distributed memory cache and distributed disk cache.

11. The computer program product of claim 10, wherein the distributed memory cache manages the link feature vector tables based on frequency and storage usage, and the distributed disk cache manages the link feature vector tables based on frequency, storage usage, processing bandwidth and coverage.

12. The computer program product of claim 10, wherein pre-computing the link feature vector tables comprises populating memory caches of the distributed memory cache, and upon a determination that the memory caches are full, caching the link vector tables into at least one disk cache of the distributed disk cache.

13. The computer program product of claim 10, wherein the program instructions executable by the processor further to cause the processor to:
update, by the processor, caches of the two-level cache hierarchy upon a determination that the matching functions are changed and the link feature vectors are no longer valid.

14. The computer program product of claim 13, wherein the program instructions executable by the processor further to cause the processor to:
examine, by the processor, a top or a bottom portion of the intermediate results to return back most similar or least similar pairs,
wherein incremental computation of links is enabled upon a determination that nearest containing rules are cached to avoid redundant computation.

15. An apparatus comprising:
a memory configured to store instructions; and
a processor configured to execute the instructions to:
perform active learning of large scale entity resolution using a distributed compute memoing cache to eliminate redundant computation;
sort cache of the two-level cache hierarchy by similarity score to obtain intermediate results;
determine vector tables for the intermediate results of the active learning of the large scale entity resolution; and
manage the link feature vector tables by using the two-level cache hierarchy.

16. The apparatus of claim 15, wherein determination of the link feature vector tables comprises one of pre-computing the link feature vector tables using a union of all blocking functions or computing the link feature vector tables dynamically upon a change of matching functions, and the two-level cache hierarchy comprises distributed memory cache and distributed disk cache.

17. The apparatus of claim 16, wherein the distributed memory cache manages the link feature vector tables based on frequency and storage usage, and the distributed disk cache manages the link feature vector tables based on frequency, storage usage, processing bandwidth and coverage.

18. The apparatus of claim 16, wherein pre-computing the link feature vector tables comprises populating memory caches of the distributed memory cache, and upon a determination that the memory caches are full, caching the link vector tables into at least one disk cache of the distributed disk cache.

19. The apparatus of claim 16, wherein the processor is further configured to execute the instructions to:
update caches of the two-level cache hierarchy upon a determination that the matching functions are changed and the link feature vectors are no longer valid; and
examine a top or a bottom portion of the intermediate results to return back most similar or least similar pairs,
wherein incremental computation of links is enabled upon a determination that nearest containing rules are cached to avoid redundant computation.

20. A method comprising:
performing, by a processor, active learning of large scale entity resolution using a distributed compute memoing cache to eliminate redundant computation;
determining link feature vector tables for intermediate results of the active learning of the large scale entity resolution; and
managing the link feature vector tables by a two-level cache hierarchy, wherein incremental computation of links is enabled upon a determination that nearest containing rules are cached to avoid redundant computation.

21. A computer program product for optimizing active learning of large scale entity resolution in a two-level distributed cache hierarchy, the computer program product comprising a computer readable storage medium having program instructions embodied therewith, the program instructions executable by a processor to cause the processor to:
perform, by the processor, active learning of large scale entity resolution using a distributed compute memoing cache to eliminate redundant computation;
determine, by the processor, link feature vector tables for the intermediate results of the active learning of large scale entity resolution; and manage, by the processor, the link feature vector tables by using the two-level cache hierarchy,
wherein incremental computation of links is enabled upon a determination that nearest containing rules are cached to avoid redundant computation.

22. An apparatus comprising:
a memory configured to store instructions; and
a processor configured to execute the instructions to:
perform active learning of large scale entity resolution using a distributed compute memoing cache to eliminate redundant computation;
determine vector tables for the intermediate results of the active learning of the large scale entity resolution; and
manage the link feature vector tables by using the two-level cache hierarchy, wherein incremental computation of links is enabled upon a determination that nearest containing rules are cached to avoid redundant computation.

* * * * *